Aug. 22, 1944.  J. W. LEIGHTON  2,356,413
SHELL CLIP
Filed Jan. 2, 1942  3 Sheets-Sheet 2
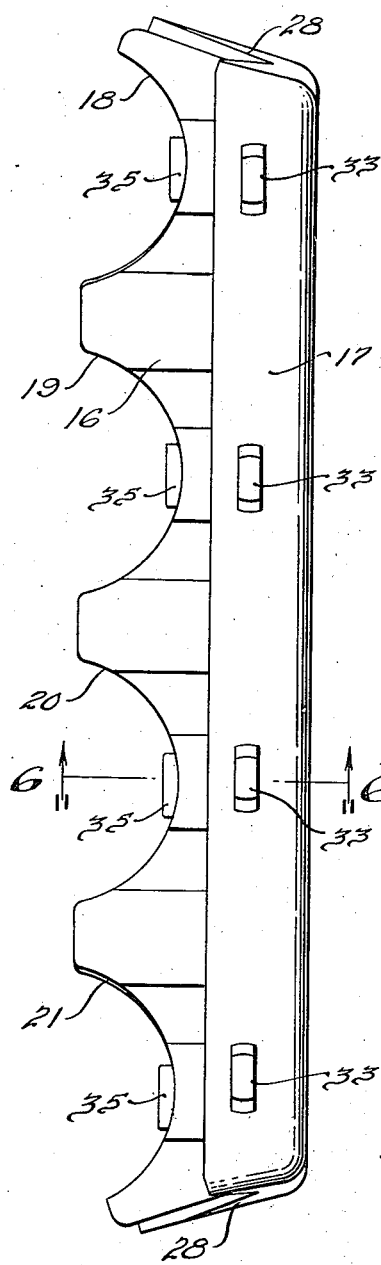
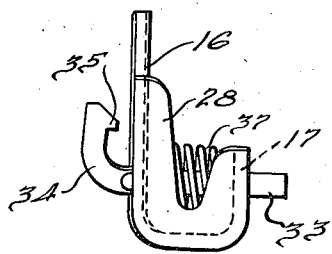
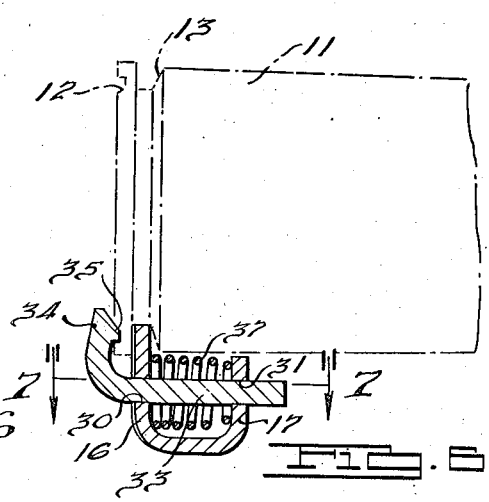
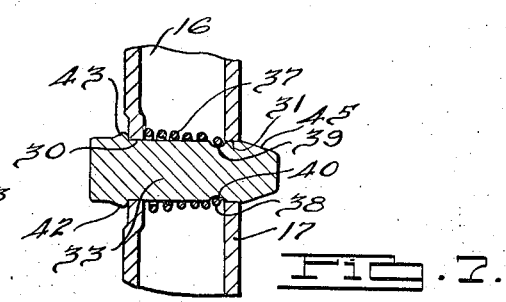
INVENTOR
John W. Leighton
BY
Harness, Dickey & Pierce.
ATTORNEYS.

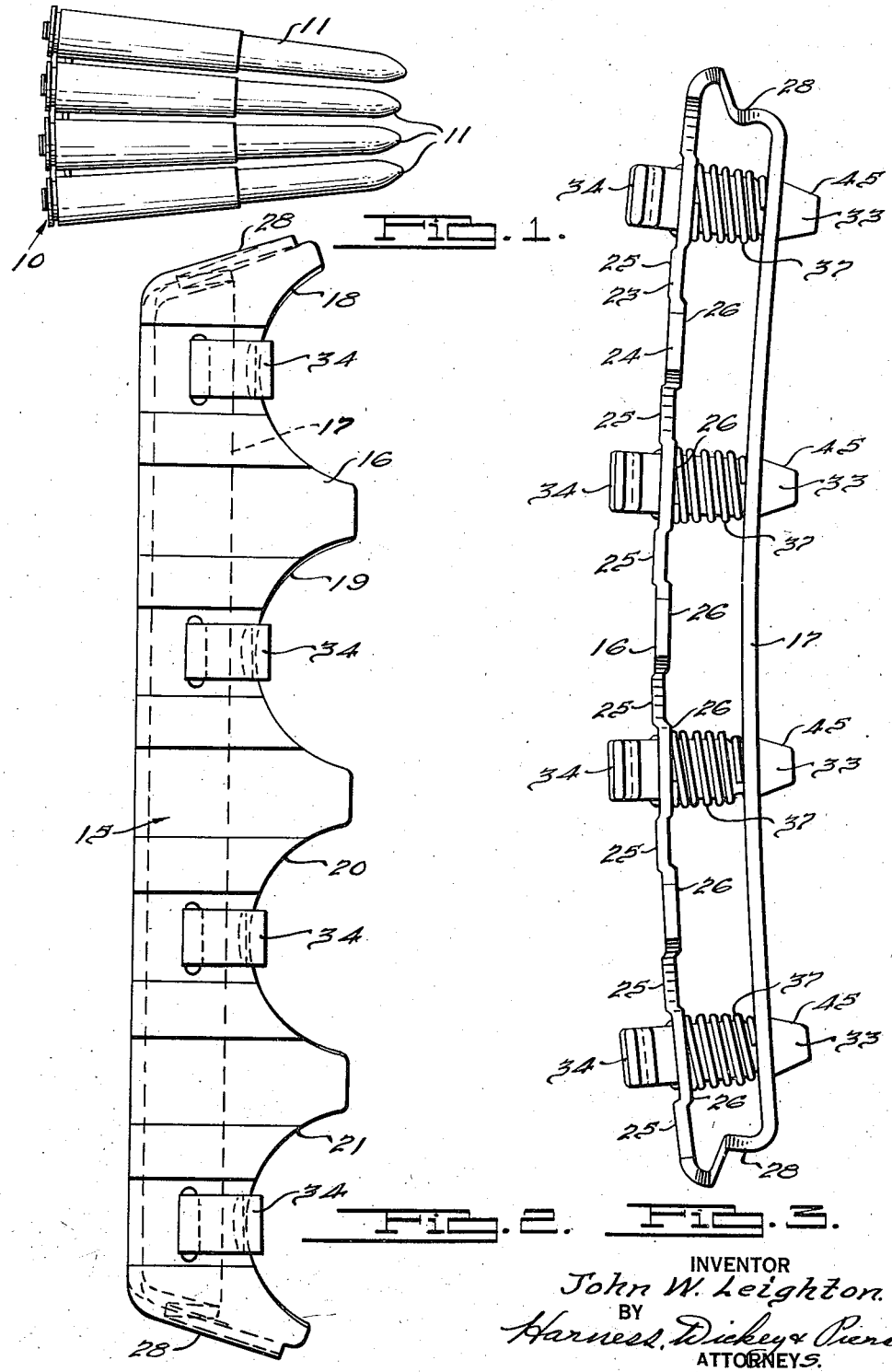

Aug. 22, 1944.          J. W. LEIGHTON                2,356,413
                          SHELL CLIP
                      Filed Jan. 2, 1942.        3 Sheets-Sheet 3
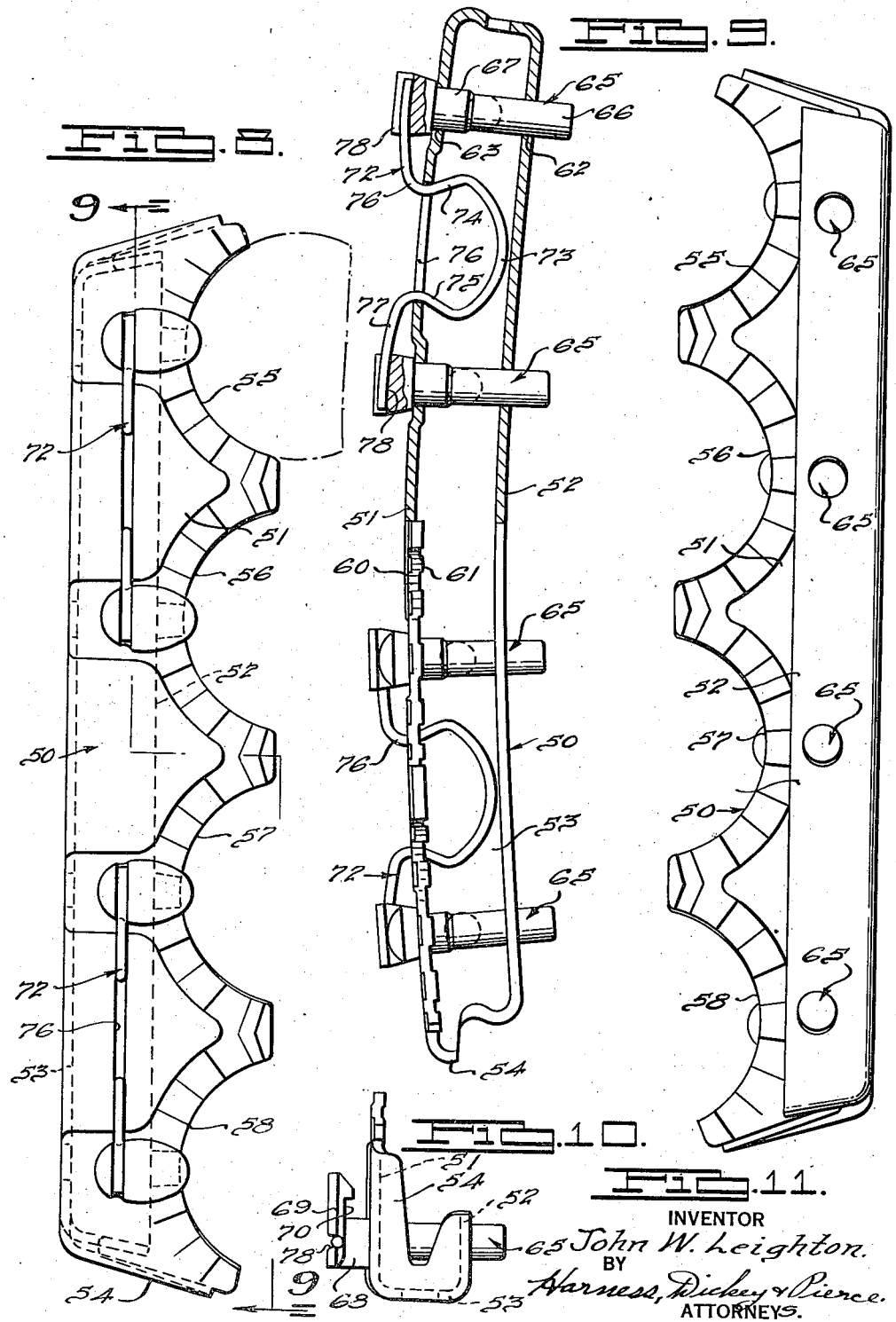
INVENTOR
John W. Leighton.
BY
Harness, Dickey & Pierce.
ATTORNEYS.

Patented Aug. 22, 1944

2,356,413

UNITED STATES PATENT OFFICE 2,356,413

SHELL CLIP

John W. Leighton, Port Huron, Mich.

Application January 2, 1942, Serial No. 425,399

14 Claims. (Cl. 89—34)

The invention relates to guns and munitions and it has particular relation to a shell clip for gun loading purposes.

Clips are in general use for holding a group of shells together as a unit adapted to be inserted into a gun. The clip and shells are inserted into the gun and during firing of the gun, the shells are successively removed from the clip. In larger guns, such for instance as a forty millimeter type used for anti-aircraft work, the shells are relatively heavy and a clip of four together may weigh as much as twenty pounds. This necessarily requides using a clip having considerable strength in order to hold the shells together both during handling and after the clip has been placed in the gun.

One object of the present invention is to provide an improved clip for this purpose which will hold a group of shells in more accurately related assembly during handling and during loading of the gun.

Another object of the invention is to provide a clip for this purpose which is extremely strong and durable so as to withstand repeated use without failure and without dislodgment or misplacement of the shells.

Another object of the invention is to provide a clip such as mentioned which may be manufactured efficiently through inexpensive manufacturing operations and with a minimum number of operations on ordinary steel stock as obtained from steel mills.

Another object of the invention is to provide methods of manufacturing a clip and its parts so as to reduce the cost and promote accuracy in the relation of the parts.

Another object of the invention is to provide a clip structure which is so designed that a minimum number of parts are used so as thereby to reduce the cost of manufacture through reduction in the number of manufacturing and assembling steps required and furthermore through reduction in the amount of metal needed.

And, in general, it is an object of the invention to provide a clip which is rigid and strong, easily loaded, which maintains the shells accurately and positively in position, and which is less expensive to manufacture.

Other objects of the invention will become apparent from the following specification, from the drawings relating thereto, and from the claims hereinafter set forth.

For a better understanding of the invention, reference may be had to the drawings, wherein:

Figure 1 is an elevational view of a clip constructed according to one form of the invention as seen when assembled with shells;

Fig. 2 is an enlarged plan view of the clip embodied in Fig. 1, with the shells removed;

Fig. 3 is a side view of the clip, as seen from the right side of Fig. 2;

Fig. 4 is a plan view, as seen from the bottom of the structure shown by Fig. 2;

Fig. 5 is an end view of the clip;

Fig. 6 is a cross-sectional view taken substantially along the line 6—6 of Fig. 4;

Fig. 7 is a cross-sectional view taken substantially along the line 7—7 of Fig. 6;

Fig. 8 is a view similar to Fig. 2 illustrating another form of the invention;

Fig. 9 is a cross-sectional view taken substantially along the line 9—9 of Fig. 8;

Fig. 10 is an end view of the clip; and

Fig. 11 is a view of the structure as seen from the side opposite that seen in Fig. 8.

As seen in Fig. 1, the clip is indicated generally at 10 and is shown as assembled with four shells, each of which is indicated at 11. As shown by Fig. 6, each of the shells has an annular groove 12 in its end wall and a similar groove 13 adjacent the groove 12 but located in the side wall of the shell. These grooves cooperate with the clip to be described.

Now referring to Figs. 2 to 7, inclusive, the clip comprises a one-piece elongated sheet metal member 15 which is substantially U shape in cross-section. The structure includes legs 16 and 17, and, as best shown by Figs. 2, 4, and 5, the leg 16 is substantially longer than the leg 17 and is provided with spaced arcuate recesses 18, 19, 20, and 21 adapted, respectively, to receive the grooved portions 13 of the four shells.

In order that a lighter gauge sheet metal may be employed while still obtaining sufficient thickness along the recesses 18, 19, 20, and 21, to fit the bottom of the grooves 13 in the shells, the leg 16, as best shown by Fig. 3, is provided with alternating portions 23 and 24 distributed along its length and which are offset laterally in opposite directions. These offset portions have flat side surfaces 25 and 26, respectively, and they are spaced in a lateral direction with such accuracy that the edge face of each of the recesses will accurately fit the bottoms of the grooves 13 in the shells. Hence, a sufficiently wide edge face is provided on the leg 16 and in the plane of the latter while still permitting use of a lighter gauge sheet metal.

For increasing the lateral rigidity of the channel structure, each end has a web 28 which laterally connects the two legs of the channel in such a manner that spreading of such legs is strongly resisted. Moreover, this web greatly strengthens the projecting end portions of the leg 16 at the ends of the two recesses 18 and 21. It might be noted in this connection that the sheet metal between recesses is substantially reinforced, but at the remote ends of the two end recesses 18 and 21, the metal in the leg 16 is not as wide nor as well supported and it follows that the web 28 provides a desirable reinforcement and support at these points. Lateral bending of the projecting end portions of the leg thus will be strongly resisted.

The legs 16 and 17 in line with the bottoms of the recesses are provided with rectangular openings 30 and 31 and, as best shown by Figs. 6 and 7, each pair of openings receives a plunger 33 which may slide in the openings in a direction transversely of the channel. Outwardly of the leg 16 the plunger is bent over to provide a hook portion 34 having a projecting part 35 adapted substantially to fit in the groove 12 of the shell. For urging the plunger into shell engaging position, a conical spring 37 is provided between the two legs 16 and 17 and one or more end coils, indicated at 38, seat in grooves 39 and 40 in opopsite side edges of the plunger. It will be understood that the normal diameter of the end coils of the spring is such that they naturally contract into the grooves 39 and 40 so that normally they remain seated in the latter.

For limiting the movement of the plunger by the springs, the plunger adjacent the outer surface of the leg 16 has offset portions 42 and 43 at opposite edges which are adapted to engage the leg 16. It should be understood in this connection that these abutments or projections for limiting movement of the plunger by the spring are so located that when the shells are in the clip, the hooks on the plungers may engage properly in the grooves 12 and from this it follows that normally the hooks may engage the shells properly before the projections 42 and 43 will engage the leg 16. Those side edge portions of the plunger which are slidable in the openings 30 and 31 will closely fit the openings so as to prevent undesirable looseness and it follows that by having a plunger rectangular in cross section and having openings rectangular in shape and by having close fits between the plunger and openings, an assembly will be provided which is not loose while still permitting sliding movement of the plunger in a free manner. It may be noted here that that end of the plunger opposite the hook is tapered as indicated at 45 so as to facilitate initial insertion af the plunger into the openings 30 and 31 during assembly, and also to ensure proper entry of the plunger into the opening 31 in the event someone pushes the plunger too far to the left.

In manufacturing the one piece channel, a blank is struck from sheet metal and while in flat condition the recesses 18 to 21, inclusive, and the plunger receiving openings 30 and 31 are approximately formed by proper tool and die equipment, with the plunger receiving openings slightly under size to allow for final broaching to exact finished size. The ends of the blank will be of such shape as to obtain the web 28 during drawing of the blank into channel form and, after the blank is so formed, it is placed on a die having a channel cavity. Then a properly shaped punch or tool draws the metal into the die to form the structure shown. The die cavity and tool are provided with flat ribs and recesses which form the alternating offset portions 24 and 25 of the leg 16, so that when the tool moves into the die, these portions are automatically and accurately formed. Suitable openings may be provided in the base of the blank for locating it properly on the die and pins may project upwardly from the die cavity to co-operate with these openings so as to properly locate the blank, as will be readily understood by those skilled in the art. After the channel is thus formed, suitable broaches may be used to shape the openings 30 and 31 to precise dimensions and in precise alignment. Similarly, the recesses 18 and 21, inclusive, may now be shaped to final precise dimensions by broaches and it will be understood in this connection that the recesses 18 and 21 during this process may be accurately located with relation to the plunger receiving openings 30 and 31.

Each plunger may be formed from strip steel which may be bent over to form the hook 34 and then this hook shaped portion may be flattened out and shaped by suitable die and tool apparatus. The sides of the plunger may be precisely dimensioned by suitable broaches so that they will fit the openings 30 and 31 in the manner previously described. These operations are performed without heating of the metal.

After the channel and plungers are thus formed, the springs may be placed in approximately proper position between the legs of the channel, and then each plunger may be pushed through the opening 30 and through the spring and then through the opening 31 and during this operation, the smaller end of the spring is expanded until one or more coils at the smaller end snap into the grooves 39 and 40 at opposite edges of the plunger. This suitably locks the plungers against withdrawal while still providing such engagement that the springs normally urge the plungers into shell engaging positions.

Assembly of the shells with the clip is effected by placing each shell in one of the recesses whie holding the plunger sufficiently spaced from the leg 16. Then upon release of the plunger, the hook projection 35 engages in the shell groove 13 and this engagement, in conjunction with the engagement of the edge of the recess with the groove 12 in the shell, accurately and positively holds the shell in place. It will be understood that the recesses are formed with precision and that the effective thickness of the metal along the edge of the recess is such that the recess snugly and closely fits the bottom of the groove 13 and hence the side wall of the leg is fitted snugly against the radial side of the groove 13. Similarly, the projection 35 on the plunger is so located with precision that it will snugly and closely fit in the groove 12 so that the bottom of the projection and axial side wall thereof closely fit corresponding parts of the groove. During manufacture of the plunger, the hook 34 and projection 35 may be accurately formed in relation to the straight body portion of the plunger and this relation, in conjunction with the accuracy of the openings 30 and 31 and the accuracy of location of such openings with respect to the recesses in the leg 16, assures that the parts will fit the shell with precision. The final result of this is that the shell will be held against looseness on the leg 16 and no additional contact is required other than the plunger engagement.

Now referring to Figs. 8, 9, 10 and 11, another form of the invention is illustrated wherein a channel member 50 is provided which has a wider leg 51 and a narrower leg 52. These legs are joined integrally at one end by a base 53 and at opposite ends of the walls and base, a reinforcing end flange or web 54 is provided. So far this structure is substantially identical to that previously described. Along the outer edge of the leg 51, recesses 55, 56, 57 and 58 are formed and each of these similarly to the structure previously described is adapted to seat one of the shells 11. In this case too, in order to use a lighter gauge metal while still having edge thickness for seating in the groove 13 in the shells, the leg at its outer edge and along the recesses mentioned is, by means of suitable tool and die apparatus, formed with alternating, zigzag portions 60 and 61.

As best shown by Fig. 9, the leg 52 is provided with openings 62 at spaced points adjacent the bottom of the recesses 55 to 58, inclusive, for receiving plungers, and the leg 51 is similarly provided with openings 63 in alignment with the openings 62. These openings are round and the openings 63 are slightly larger than the openings 62. Each pair of openings is adapted to receive a plunger 65 which has a smaller shank portion 66 reciprocatory in the openings 62 and a slightly larger portion 67 reciprocatory in the opening 63. At the outer side of the leg 51, the plunger is formed with an enlarged head 68, as best shown by Fig. 10, and this head has a hook 69 adapted to engage in the groove 12 of the shell and between this hook and the center line of the plunger, the head is relieved, as indicated at 70, so as to accommodate the shell rim. For urging the plungers into shell engaging positions, a wire spring element 72 is provided for each pair of plungers. The central part of each spring is bowed, as indicated at 73, and outwardly of the bowed portion, the spring has straight side portions 74 and 75. This part of the spring is disposed in a slot 76 in the leg 51 and the length of the slot is such that the spring normally remains in the position shown. Outwardly of the straight side portions 74 and 75, the ends of the wire are reversely bent to provide straight portions 76 and 77 and these portions lie in diametrically located slots 78 in the plunger heads. It follows that if any plunger is moved to the left by manual pressure on the end opposite the head of the plunger, its movement will be resisted by the spring, and it might be noted in this connection that the end of the spring element will have sliding movement in the diametrical slot of the plunger head. It follows that the spring changes its leverage as the plunger moves out and the pressure will not build up as rapidly as it would otherwise.

The plungers may be formed from wire stock substantially corresponding in diameter to the diameter of the smaller shank portion 66 of the plunger. The head on the plunger, including the hook shaped portion 69 and the slightly larger shank portion 67, is formed by upsetting operations performed on the wire. It will be understood in this connection that a length of wire is upset through compression of the metal axially, so as to enlarge the end of the wire, and that the shape of the enlargement can be controlled by dies so that the head, hook, and slightly larger shank portion will be accurately formed. This head upsetting operation is done without heating of the metal, or, in other words, is a cold heading action.

By forming the plunger with precision, by locating the openings in the channel legs accurately in relation to the shell receiving recesses, and by shaping the openings and recesses with precision, an arrangement is obtained which positively holds the shells in position without looseness. In this structure, as well as in the first structure described, the shells are supported and held on the longer channel leg alone and additional support is not necessary.

Although more than one form of the invention has been described and illustrated in detail, it will be apparent to those skilled in the art that various modifications may be made without departing from the scope of the appended claims.

What is claimed is:

1. A shell clinch comprising a pair of spaced plate portions each having an opening and the openings being aligned for slidably receiving a shell retaining plunger, a plunger slidable in the openings, a coil spring encircling the plunger between the plates, and means connecting one convolution of the spring with the plunger and comprising a groove in the side surface of the plunger and into which such convolution is contracted.

2. A shell clip comprising a pair of spaced plate portions each having a non-circular opening and the openings being aligned for slidably receiving a shell retaining plunger, a plunger slidable in the openings, a tapered coil spring encircling the plunger between the plate portions, and means connecting one convolution of the spring with the plunger and comprising a groove in the side surface of the plunger and into which the convolution is contracted.

3. A shell clip comprising a pair of spaced plate portions each having a rectangular opening and the openings being aligned for slidably receiving a shell retaining plunger, a plunger rectangular in cross section slidable in the openings, a tapered coil spring between the plate portions and encircling the plunger, and means connecting one convolution of the spring with the plunger and comprising a groove in a side surface of the plunger and into which the convolution is contracted.

4. A shell clip comprising a pair of spaced plate portions each having a rectangular opening and the opening being aligned for slidably receiving a shell retaining plunger, a plunger rectangular in cross section slidable in such openings, a tapered coil spring encircling the plunger between the plate portions, and means connecting a convolution of the spring at its smaller end to the plunger and comprising grooves in the opposite, smaller edge faces of the plunger and into which such convolution is contracted.

5. A shell clip comprising a plate portion having a shell receiving recess in one side edge and a plunger receiving opening adjacent the recess, a plunger in such opening, a coil spring encircling the plunger at one side of the plate and bearing at one end against the latter, and means connecting the other end of the spring to the plunger and comprising a groove in a side face of the plunger and into which an end convolution of the spring is contracted.

6. A shell clip comprising a shell supporting frame having a shell receiving recess and a rectangular plunger opening adjacent the recess, and a plunger slidable in such recess and comprising a length of metal of rectangular cross section and having a bent over shell engaging hook portion at one side of the frame.

7. A shell clip comprising a shell supporting frame having a shell receiving recess and a rectangular plunger opening adjacent the recess, and a plunger slidable in such recess and comprising a length of metal of rectangular cross section and having a bent over widened shell engaging hook portion at one side of the frame.

8. A shell retaining clip comprising spaced first and second plate elements each having a transverse opening and the openings being aligned, a plunger slidable in said openings, a shell retaining head on the plunger at the outer side of the first plate, and a coil spring around the plunger between the plates and abutting at one end said first plate, said plunger adjacent the second plate having a portion of reduced transverse dimensions as compared to the portion slidable in the opening in the first plate and having a shoulder adjacent the reduced portion and next to the second plate and facing the first plate, said spring having one portion contracted into engagement with said reduced portion and abutting said shoulder, the arrangement and relation of parts being such that in assembling them together the plunger can be inserted through the opening in the first plate from the outer side thereof and then forced through the spring until the plunger enters the opening in the second plate and the spring contracts into the reduced portion of the plunger.

9. A shell retaining clip comprising spaced first and second plate elements each having a transverse opening and the openings being aligned, a plunger slidable in said openings, a shell retaining head on the plunger at the outer side of the first plate, and a coil spring around the plunger between the plates and abutting at one end said first plate, said plunger adjacent the second plate having a portion of reduced transverse dimensions as compared to the portion slidable in the opening in the first plate and having a shoulder adjacent the reduced portion and next to the second plate and facing the first plate, said spring having one portion contracted into engagement with said reduced portion and engaging said shoulder, said plunger also having a tapered end at the side of the shoulder opposite the reduced portion for facilitating passage of the plunger through the spring, the arrangement and relation of parts being such that in assembling them together the plunger can be inserted through the opening in the first plate from the outer side thereof and then forced through the spring until the plunger enters the opening in the second plate and the spring contracts into the reduced portion of the plunger.

10. A shell retaining clip comprising spaced first and second plate elements each having a transverse opening and the openings being aligned, a plunger slidable in said openings, a shell retaining head on the plunger at the outer side of the first plate, a coil spring around the plunger between the plates and abutting at one end said first plate, said plunger adjacent the second plate having a portion of reduced transverse dimensions as compared to the portion slidable in the opening in the first plate and having a shoulder adjacent the reduced portion and next to the second plate and facing the first plate, said spring having its end convolution adjacent the second plate contracted into engagement with said reduced portion and engaging said shoulder, and an abutment on the plunger at the outer side of the first plate for limiting movement of the plunger through the first plate, the parts being so related that in assembling them together the plunger can be inserted through the opening in the first plate from the outer side thereof and then forced through the spring until the plunger enters the opening in the second plate and the end convolution of the spring contracts into engagement with the reduced portion of the plunger.

11. A shell retaining clip comprising a plate element having a transverse opening, a plunger slidable in and substantially fitting the opening so as to avoid looseness, and a coil spring around the plunger at one side of the plate with one end of the spring abutting the plate, said plunger towards its opposite end having a portion of smaller cross-sectional dimensions as compared to the part slidable in the opening and also having a shoulder adjacent said smaller portion and facing the plate element, said spring having one convolution contracted into engagement with said smaller portion and abutting said shoulder, the arrangement and relation of parts being such that in assembling them together, the plunger can be inserted through the opening from the outer side of the plate and then forced through the spring until said convolution of the spring contracts into engagement with said reduced portion of the plunger.

12. A shell retaining clip comprising a plate element having a transverse opening, a plunger slidable in the opening and having a shell retaining head on its end at one side of the plate element, a coil spring around the plunger at the other side of the plate with one end of the spring abutting the plate, said plunger towards its opposite end having a shoulder which is passable through the opening, and which has a side facing the plate, the spring having a portion abutting said side of the shoulder so as to urge the plunger in such direction that the head is urged towards the plate, the arrangement and relation of parts being such that in assembling them together, the plunger can be inserted through the opening from the first-mentioned or outer side of the plate and then pushed through the spring until said portion of the spring expands and passes over the shoulder and contracts into abutting relation with the side of the latter next to the plate.

13. A shell retaining clip comprising spaced first and second plate elements each having a transverse opening and the openings being aligned, a plunger slidable in the openings and having a shell retaining head on its end at the outer side of the first plate, a coil spring around the plunger between the plates with one end of the spring abutting the first plate, said plunger towards its opposite end having a shoulder which is passable through the opening in the first plate, and which has a side facing the first plate, the spring having a portion abutting that side of the shoulder facing the first plate so as to urge the plunger in such direction that the head is urged towards the first plate, the arrangement and relation of the parts being such that in assembling them together the plunger can be inserted through the opening in the first plate from the outer side thereof and then forced through the spring until the plunger enters the opening in the second plate and said portion of the spring passes over said shoulder and contracts into abutting relation with that side of the latter facing the first plate, said spring having a portion adapted to engage the second plate so that the latter may serve to hold the spring against endwise movement with the plunger when the latter is forced through the spring.

14. A shell retaining clip comprising spaced first and second plate elements each having a transverse opening and the openings being aligned, a plunger slidable in the openings and having a shell retaining head on its end at the outer side of the first plate, a coil spring around the plunger between the plates with one end of the spring abutting the first plate, means on the plunger at the outer side of the first plate for limiting movement thereof through the openings, a shoulder on the plunger towards its opposite end and which is passable through the opening in the first plate, said shoulder having a side facing the first plate and said spring having a portion abutting said side of the shoulder so as to urge the plunger in a direction so as to urge the head towards the first plate, the arrangement and relation of the parts being such that in assembling them together the plunger can be inserted through the opening in the first plate from the outer side thereof and then forced through the spring until the plunger enters the opening in the second plate and said portion of the spring passes over said shoulder and contracts into abutting relation with that side of the latter facing the first plate, said spring having a portion adapted to engage the second plate so that the latter may serve to hold the spring against endwise movement with the plunger when the latter is forced through the spring.

JOHN W. LEIGHTON.